United States Patent [19]
Jebb et al.

[11] 4,086,576
[45] Apr. 25, 1978

[54] AXLE LOAD MONITORING SYSTEMS

[75] Inventors: Alan Jebb, Keston; James George Arthur Rees, Bromley; Raymond Lawrence, Maidstone, all of England

[73] Assignee: C. L. Instruments Limited, England

[21] Appl. No.: 633,958

[22] Filed: Nov. 20, 1975

[30] Foreign Application Priority Data
Nov. 27, 1974 United Kingdom ............... 51263/74

[51] Int. Cl.² ........................ G08B 21/00; B60R 27/00
[52] U.S. Cl. ............................. 340/272; 73/88.5 SD; 340/52 R; 340/285
[58] Field of Search ..................... 340/272, 285, 52 R; 180/100; 73/88.5 SD

[56] References Cited
U.S. PATENT DOCUMENTS

| 3,137,834 | 6/1964 | Pfann | 73/88.5 SD |
| 3,315,201 | 4/1967 | Werme | 73/88.5 SD |
| 3,324,287 | 6/1967 | Fetterman et al. | 180/100 |
| 3,646,512 | 2/1972 | Borgstede | 340/272 |

Primary Examiner—Glen R. Swann, III
Attorney, Agent, or Firm—Hill, Gross, Simpson, Van Santen, Steadman, Chiara & Simpson

[57] ABSTRACT

The deflection of an axle when under load is monitored by at least one load monitoring device mounted on the axle. At least one pair of strain gauge elements forms each load monitoring device, the strain gauge elements of each pair being arranged to measure strain in different directions. An amplifier is connected to the load monitoring device and adapted to emit a signal depending upon the load. A comparator circuit is connected to the amplifier, the comparator circuit being arranged to activate an alarm should the signal received from the amplifier exceed a predetermined value. Preferably the comparator circuit is adapted to both emit a continuous signal when the system is energized and the load on the axle is smaller than a predetermined weight, and to change the signal to another signal when the load exceeds the predetermined weight, the signal being used to control the alarm.

25 Claims, 17 Drawing Figures

BULB-TYPE SOLAR ENERGY COLLECTOR

The present invention relates to a solar energy collector apparatus for collecting energy from the rays of the sun on an absorber surface and exchange of the collected energy as heat to a working media, such as air or water, circulated through the apparatus. More particularly, the invention relates to a bulb-type solar collector unit having a parabolic mirror surface and a tube-type absorber whose axis is on the focal axis of the parabola of the mirror surface.

THE INVENTION RELATED TO THE PRIOR ART

Although parabolic reflector devices of this general type have been disclosed in the prior art, for example see U.S. Pat. Nos. 1,575,309 (1926); 2,460,482 (1949) and 3,130,084 (1964), the present invention is directed to a vacuum sealed unit having essentially all glass parts in the construction and possessing improved thermal properties. Since the unit is subjected to a range of temperature variations (heating and cooling of the parts thereof), the sealed together parts perform in a superior manner due to the glass construction thereof. In other words, the assembly of glass parts has a nearly uniform thermal coefficient of linear expansion and contraction providing a practical and durable unit in operation.

In the present invention, by encasing the absorber element of the apparatus in a vacuum within the parabolic glass reflector, heat loss through convection and conduction is reduced to a minimum. Furthermore, to reduce heat loss by radiation or re-radiation, the exposed surface of the absorber element is minimized. In addition, the life expectancy of the selective coating on the absorber element will be enhanced.

The prior art parabolic focusing type of solar collectors, such as set forth in the earlier mentioned U.S. patents, are cumbersome and large installations not suited for residential dwellings or "homeowner" uses. The present invention provides an economical and inexpensive focusing collector adaptable for homeowner use as well as for the larger demand type installations. Moreover, as distinguished from prior collectors of this type, the present invention provides a collector array which needs not "track" the sun when in daily use through the use of elaborate filtering or orienting mechanisms. Yet, the collector of this invention is capable of providing operating temperatures high enough to develop mechanical power, i.e. through hot water, steam or the like.

The collector of the present invention, being constructed of glass parts, may be manufactured and assembled by utilizing conventional equipment, such as glass forming equipment suitable for pressing and blow molding glass articles. The collector, in one form of use of the invention, may be shaped into interfitting or interlocking assemblies (likened to laying out tile or roofing pieces) to provide a surface (viz a curtain wall) that is impervious to weather when situated on a favorable solar exposure of a building, e.g. the roof or a wall surface.

SUMMARY OF THE INVENTION

The solar collector element comprises a molded glass bulb-type envelope which has an interior parabolic specular reflecting surface and an enclosed coated glass absorber tube located inside the bulb envelope on the focal axis of a paraboloid of revolution. The front facing area of the bulb is covered by a transparent glass cover plate which may be nearly flat or curved, depending upon the desired installation, and the absorber tube is thereby enclosed in the space within the face plate and bulb. The interior of the bulb envelope is evacuated to a vacuum condition. The exterior surface of the glass absorber tube has an opaque coating of a solar energy absorbing material of a type hereinafter disclosed to absorb the solar energy focused thereon by the parabolic reflector surface. The tubular absorber portion of the bulb has its innermost end closed and the opposite end open such that in the assembly, the glass of the bulb at the apex region of the parabolic reflector is formed integral with the exterior of the glass absorber tube as a sealed unit and the open end of the absorber tube is directed outside the base of the parabolic reflector bulb, so to speak, at the apex of the bulb. The collector is in the form of a sealed container unit.

One significant feature of the invention is the means in the structure by which radiation heat loss is reduced. This is accomplished by keeping the exposed surface area of the absorber member to a minimum. This invention provides a practical solution to radiation heat loss by using a vertically disposed tubular absorber member of short length disposed along the axis of a parabolic reflector surface of relatively large surface area.

A manifold of the apparatus delivers a working heat exchange media, such as air or water, into the protruding open shank end of the absorber tube for circulation therein to its closed end and back to the open end thereof into the manifold. The media circulation may be in series between a number of the bulb collectors or in a parallel connection to a plurality of the collectors. The face of each collector includes a glass face plate. The faces of the bulb collectors will, of course, be arranged on a plane facing the sun. Several of the bulb collectors may be arranged in an array and interconnected to form a facing or impervious surface at the sun facing plane, thereby providing a curtain wall or roofing effect for the installation. To achieve this, a peripheral outwardly extending flange is molded on each bulb at the match plane for the lens and body of the bulb. The flanges of adjacent bulbs are placed in an abutting relationship and sealed together with a grouting or otherwise fitted together with firring strips. From the standpoint of appearance in a wall or curtain of the collectors, the face plates should be nearly flat or planar, however, the bulbs are under a heavy vacuum and to achieve a greater strength-to-weight ratio for a given bulb size, a domed or curved face plate is preferable.

As described more particularly hereinafter, the parts of the bulb-type collector are molded in glass in an integral one-piece assembly fitted with a separate face plate. the separate face plate is a pressed glass piece.

The bulb collectors are assembled onto a manifold apparatus by inserting an outwardly depending hollow shank thereof into an aperture formed in the manifold. In one form of the invention, the shank is sealed in the manifold aperture by rubber ring gasket or ring grommet seals. In another form of the invention, the shank is molded with threads. The aperture of the manifold has mating threads formed therein with a gasket seat which seals the connection.

The fluid from the manifold is circulated into and along the length of the absorber tube of the bulb and back into the manifold by fluid handling means extending into the hollow absorber tube. Circulation of the ent invention thus provides for a type of digital operation of the system.

The systems constructed according to the present invention and the further features of the present invention monitor the axle load. However these systems may be modified to monitor the eccentricity of the axle loading i.e. which end of the axle has the greater load, and to activate an alarm should the difference between the loads on each end of the axle differ by more than a predetermined percentage of the maximum permitted load limit of the axle.

BRIEF DESCRIPTION OF THE DRAWINGS

The present invention will now be further described, by way of example, with reference to the accompanying drawings, in which.

DESCRIPTION OF THE PREFERRED EMBODIMENTS

Figures 1, 2A, 2B:
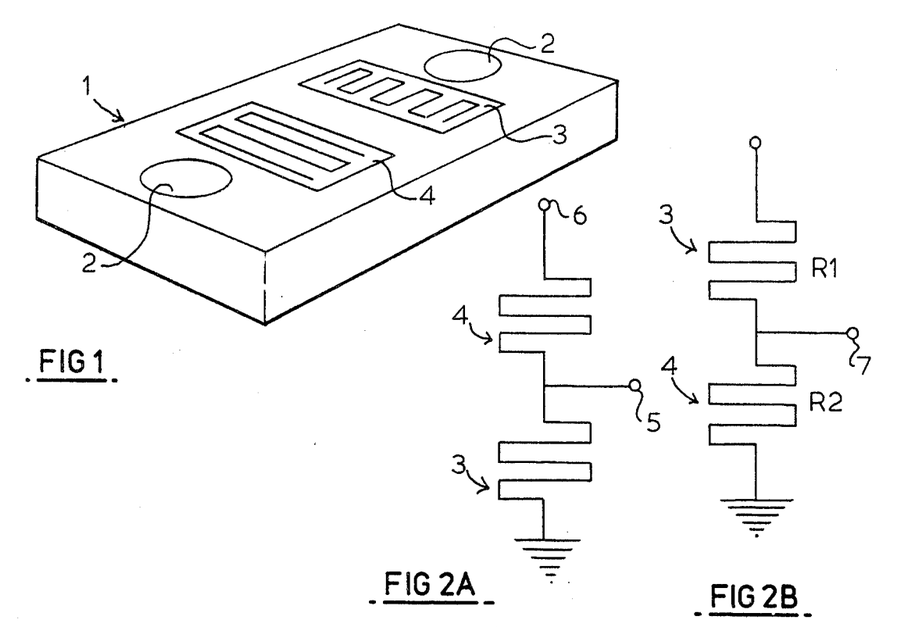
FIG. 1 is a perspective view of a load monitoring device for use in a system constructed according to the present invention.
FIG. 2A is a circuit diagram illustrating one mode of connection of the load monitoring device shown in FIG. 1.
FIG. 2B is a circuit diagram illustrating a further mode of connection of the load monitoring device shown in FIG. 1.

In FIG. 1 of the accompanying drawings is illustrated part of a preferred embodiment of a load monitoring device for use in the present invention, the device comprising a generally rectangular carrier plate 1 having a fixing hole 2 at each end thereof, one foil type strain gauge element 3 i.e., an active gauge, being arranged to measure strain along a line extending between the fixing hole 2, another foil type strain gauge element 4 i.e., a dummy gauge, being arranged to measure strain in a direction at 90° to the line extending between said fixing holes. Alternatively, the strain gauge element 3 and 4 can be arranged to measure strain acting on the carrier plate in any different direction. Preferably though they measure strains in directions at 90° to each other.

The load monitoring device of FIG. 1 can be connected in an electrical circuit in either of two ways as illustrated in FIGS. 2A and 2B. Assuming that active gauge 3 has a resistance R1 and dummy gauge 4 has a resistance R2, the output voltage at point 5 in the case of the connection as shown in FIG. 2A with the active gauge 3 directly connected to zero volts, is V(R1)/R1 + R2); V being the D.C. voltage applied at 6. If the active gauge 3 is now strained and its resistance is accordingly decreased by a factor X the output voltage at point 5 is now increased to V(R1 − X R1)/(R1 − X R1 + R2). If R1 and R2 are approximately the same then the increase in voltage can be shown to be (V) X14 (this is a first order approximation). Similarly, in the case of a load monitoring device connected as illustrated in Fig. 2B with dummy gauge 4 directly connected to earth, the output voltage at point 7 when the active gauge 3 is strained by a factor Y, decreases by V(Y)/4 (this is a first order approximation the gauge resistances being again approximately the same). Thus, it is clear that the output voltages at 5 and 7 are directly proportional to the strains applied.

The dummy strain gauge 4 provides a temperature compensation effect. The gauges used preferably have a temperature coefficient matched to steel. That is, as temperature is increased, the axle and gauge carrier expand and the resistance of the gauge falls. The particular alloy from which the gauges are made is designed such that as the expansion of the steel strains the gauge and attempts to increase the gauge resistance, the negative temperature coefficient of the gauge reduces this effect to almost zero. Unfortunately, as the coefficient of thermal expansion of steel also depends on its compositions, this self compensation can only be used as a first order effect. However, the arrangement of the two strain gauges in a load monitoring device improves the zero stability since a temperature change causes the gauge carrier plate to deform uniformly in all planes, changing both gauge resistances by the same amount and leaving the output voltage unchanged. Further, the induced transverse strain which is produced when the carrier is strained, is not a designed feature, but a bonus obtained by having the dummy gauge 4 at right angles to the active gauge 3. Direct stress produces a strain in its own direction and an opposite strain in all directions perpendicular to its own. Thus the gauge carrier plate under compressive stress contracts longitudinally and expands laterally. Within elastic limits the ratio (Poisson's ratio) of lateral strain/longitudinal strain is a constant for a given material i.e., $1/m$ where $m$ is usually from 3 to 4. Outside elastic limits a non-linear element could be used to compensate.

Figure 3:
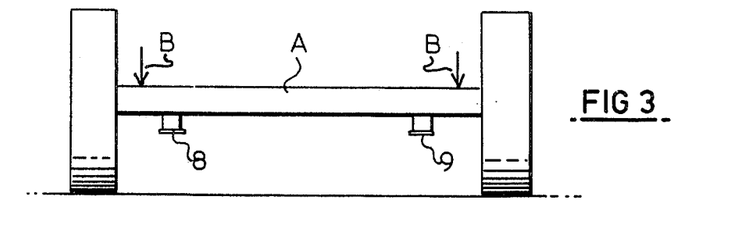
FIG. 3 is a diagrammatic illustration of an axle incorporating two load monitoring devices.
Figure 4:
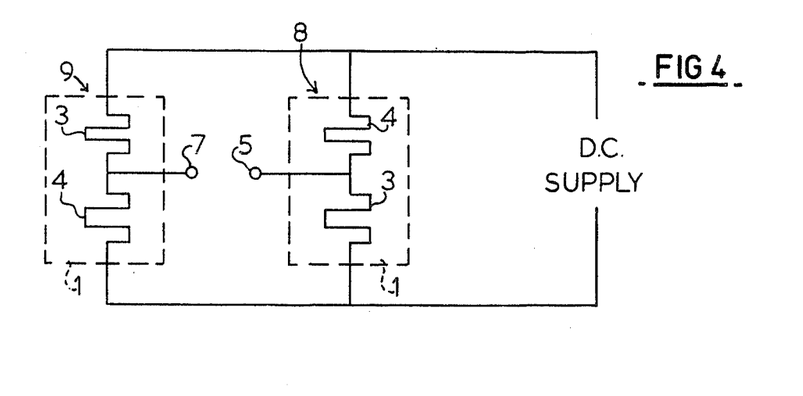
FIG. 4 is a circuit diagram illustrating the bridge circuit connection of the load monitoring devices in FIG. 3.

In a preferred embodiment of the system according to the present invention a load monitoring device as described hereabove is mounted on an axle housing at each end region thereof just inboard of the suspension B (FIG. 3). The means of attachment of the load monitoring devices will be described later. The devices are both fixed to the underside of the axle housing to thus measure the axle extension due to loading. Alternatively, the two devices can be fixed to the top of the axle housing to thus measure the compression produced by axle loading. One device 8 at one end of the axle is electrically connected as shown in FIG. 2A and the other device 9 at the other end of the axle is electrically connected as shown in FIG. 2B, the devices being effectively wired into a 4-arm bridge as illustrated in FIG. 4. The two devices are arranged such that their respective output voltages are equal and opposite thus producing a zero voltage across the output terminals 5 and 7 of the 4-arm bridge (i.e. the bridge balances), when the devices are under no strain. This zeroing of the bridge is effected by part of the amplifier to which the bridge output is fed. As load is applied to the axle a voltage occurs between the two output terminals 5 and 7 of $(X+Y)V/4$, this voltage being directly proportional to the sum of the strains.

Figure 5:
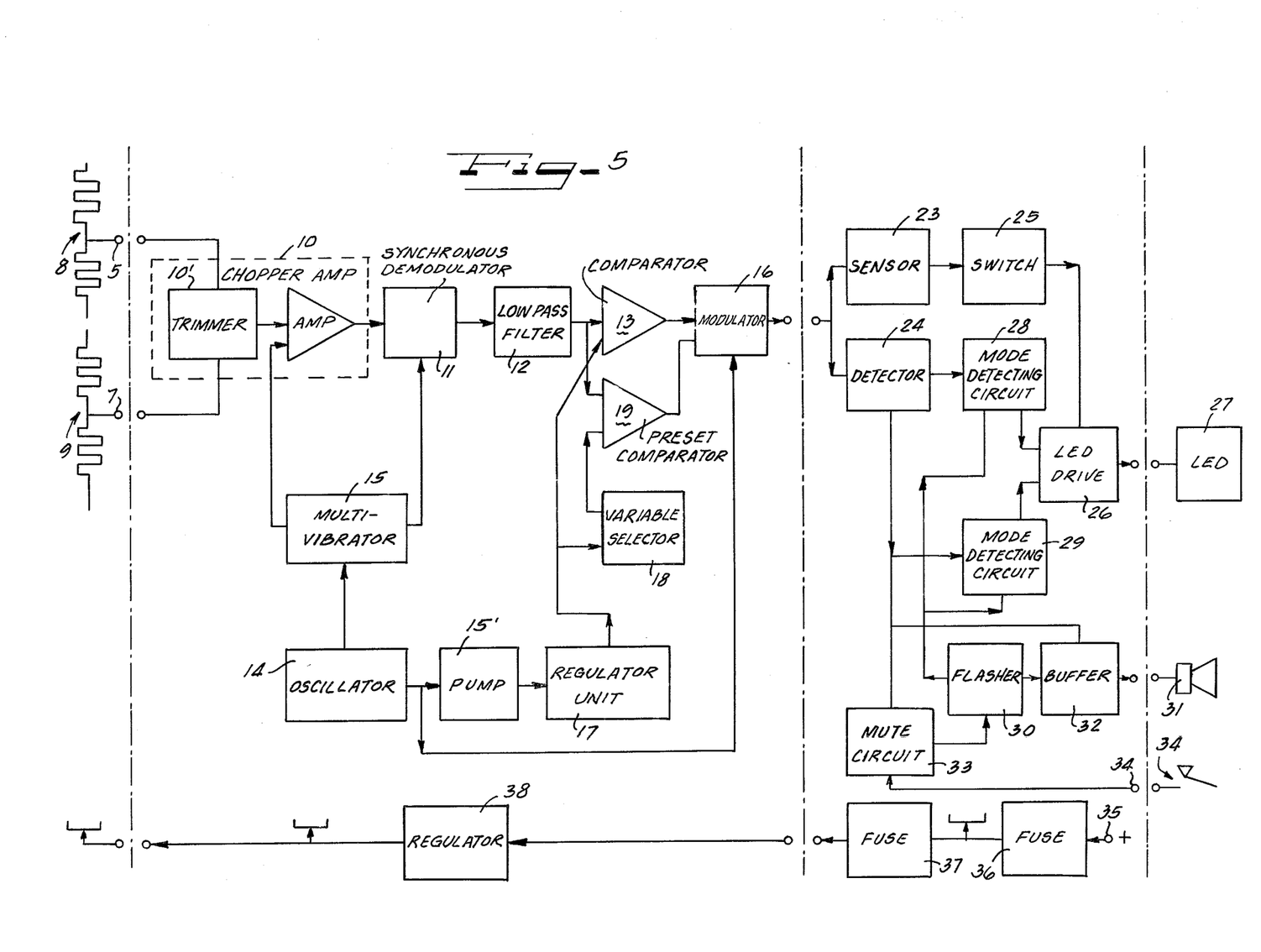
FIG. 5 is a detailed block diagram of a preferred embodiment of a system constructed according to the present invention.

Referring now to FIG. 5, in which the detail of the preferred embodiment of the present invention is schematically illustrated, the outputs 5 and 7 of the bridge circuit are connected to a chopper amplifier 10 whose gain is set when the system is calibrated for a maximum permitted load limit of an axle. The bridge is balanced to produce the required zero voltage bridge output when the vehicle is unladen, by means of a trimmer 10' within the amplifier 10. Thus as the vehicle is loaded the bridge output is representative of the actual load. If desired the amplifier may be adjusted to provide a bridge output representative of the gross weight of the vehicle i.e. load plus tare weight of the vehicle. A chopper amplifier is used because of the low input voltage from the foil-type strain gauges. A d.c. amplifier would be unsuitable since its input offset drift would be of a comparable order of magnitude to the low input voltage. However, in a system in which semiconductor strain gauges replace the foil-type gauges, a d.c. amplifier could replace amplifier 10. The chopper amplifier 10 has field effect transistor inputs which convert the bridge output into a square wave signal of about 1KHz with a peak to peak height equal to the bridge output. This signal is amplified and has a peak to peak height independent of circuit drift, which reaches a predetermined level at maximum permitted axle load. This square wave is fed from amplifier 10 to a synchronous demodulator 11 which converts the square wave to an analog d.c. signal referred to ground. This signal is then passed through a low pass filter 12 to a comparator 13, the low pass filter 12 enabling the system to be relatively insensitive to bouncing of the vehicle. An oscillator 14 feeds a signal to bistable multivibrator 15 which controls the chopper circuit of amplifier 10. The bi-stable multivibrator is also connected to the demodulator 11 to effectively synchronise the chopper and the demodulator. The oscillator 14 also feeds a signal to a so-called pump 15' and a modulator circuit 16. The pump 15' generates a d.c. voltage signal which is stabilised in regulator unit 17 to provide a stabilised reference voltage representative of the maximum permitted axle load. This signal is fed to an input of fixed comparator 13 and should the value of this signal be exceeded by the signal received from filter 12, then comparator 13 will emit a signal which is passed to modulator circuit 16. A portion of the stabilized reference voltage emitted by unit 17 is tapped off and fed via a variable selector 18 to a preset comparator 19, the tapped signal being representative of a percentage of the maximum permitted axle load. This tapped signal may for example represent 90% of the permitted load limit. Should the value of the signal received by comparator 19 from filter 12 exceed the tapped signal, comparator 19 will feed a signal to modulator circuit 16. Variable selector 18 enables the tapped signal to be varied to thus correspond to different percentages of the maximum permitted load. If required further tapping circuit feeding further comparators may be provided, thus sensing when different axle loads are exceeded. The modulator circuit 16 is also energized by oscillator 14 and is adapted to note the comparator signal received. The comparators 13, 19 and modulator circuit 16 form a comparator circuit. Dependent upon the signal received from one or other of the comparators 13, 19 the modulator circuit 16 changes the signal which it is to pass to a cab-mounted control box 20 (FIG. 6) incorporating the various alarms. The modulator circuit 16 may be adapted to change its output signal either by changing the amplitude or frequency of the signal.

Figures 6, 7, 8, 13, 14:
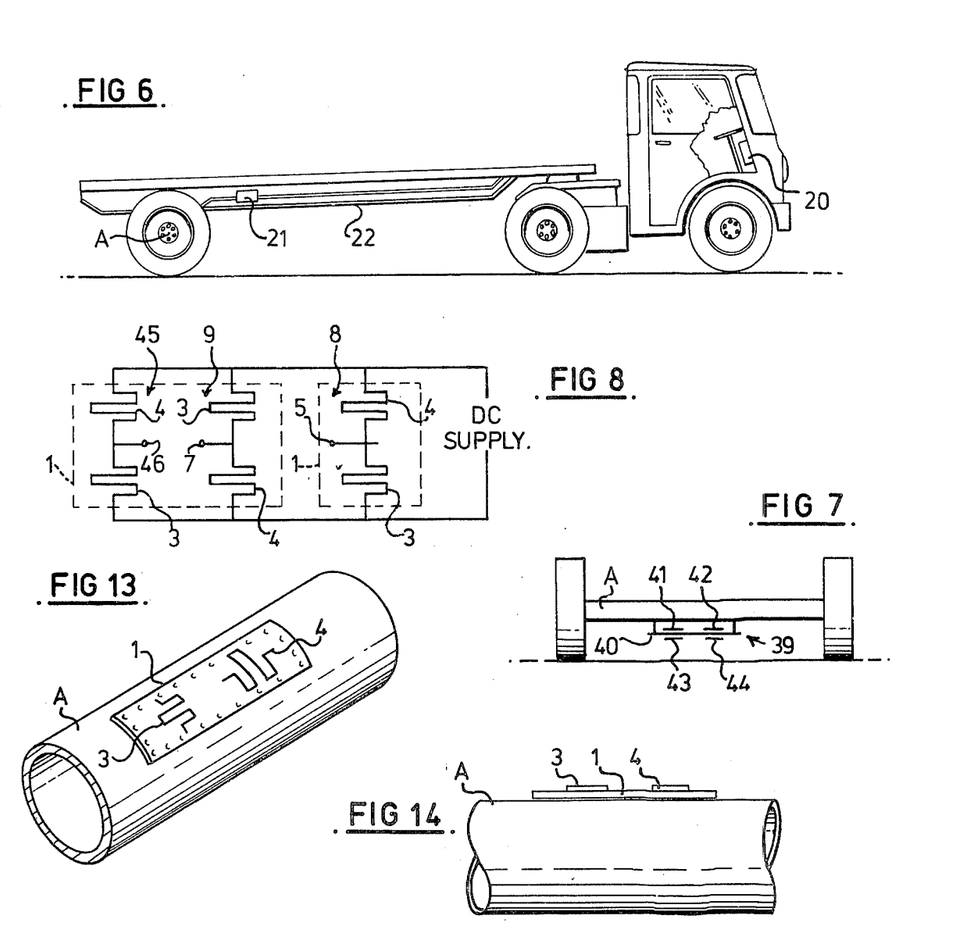
FIG. 6 is a diagrammatic illustration of a truck incorporating a system according to the present invention.
FIG. 7 is a diagrammatic illustration of an axle incorporating a single centrally mounted load monitoring device.
FIG. 8 is a modification of the circuit of FIG. 4 including a facility for monitoring the eccentricity of a load on an axle.
FIGS. 9, 10, 10A, 11, 12, 13 and 14 illustrate different modes of attachment of a load monitoring device to an axle.

All of the previous circuitry except for the load monitoring devices 8, 9 is located in a single casing 21 located on the vehicle chassis 22 (FIG. 6). Alternatively though the circuitry may be separated into a number of protective casings. For example the comparator and modulator circuits could be located in a separate casing in the vehicle cab.

The signal emitted by the modulator circuit 16 is fed to the control box 20 mounted in the vehicle cab. The signal is received by a sensor 23 and a detector 24 in the control box. The sensor 23 detects whether any signal is in fact present i.e. whether the system is energized, and in the event that a signal is received the sensor 23 via a switch 25, activates a light emitting diode drive 26 and lights diode 27 — green. Detector 24 senses which signal has been received i.e. from which comparator, and dependent upon the signal received activates light emitting diode mode detecting circuit 28 or 29. When comparator 19 emits a signal i.e. when a percentage of the maximum permitted axle load has been exceeded, the detector 24 passes a signal to circuit 28 and to flasher 30, the flasher 30 feeding back to circuit 28. This causes light emitting diode 27 to flash green. When comparator 13 emits a signal i.e. the maximum permitted axle load is equalled or exceeded, the detector 24 passes a signal to circuit 29 and to flasher 30 which feeds back to circuit 29. This causes the light emitting diode 27 to — flash red. The flasher 30 also feeds horn 31 via a buffer 32 so that an audible warning is provided when the light emitting diode 27 flashes red or green. A mute circuit 33 located between detector 24 and flasher 30, and controllable by a manually operable switch 34 enables a driver to switch off the audible alarm i.e. horn 31 and to stop the diode 27 flashing. The switch 34 is preferably a push button on the control box 20. The power for the system is provided by the vehicle battery the positive terminal 35 of which is evident in FIG. 5. Power is passed via a fuse 36, fuse 37 and a voltage regulator 38 to the amplifier, control box and load monitoring devices. The fuse 36 protects against the system's being damaged by incorrect connection to the battery.

In use, the system schematically illustrated in FIG. 5, will, when energized light the light emitting diode 27 — green. If the axle load is greater than a predetermined percentage of the maximum permitted load, diode 27 will — flash green, and an audible warning will sound. Should the axle load equal or exceed the maximum permitted load, diode 27' will — flash red, and an audible warning will sound.

Whilst the above is described with a single light emitting diode 27 providing all the visual alarms, this diode can of course be replaced by separate warning lamps and if the axle load is monitored at a number of different weights, a series of warning lamps can be provided.

The control box 20 (FIG. 6) is adapted to cater for a plurality of axles so that the system described hereabove with reference to FIG. 5 is multiplied by the number of axles monitored and a bi-colour light emitting diode or a series of warning lights are provided for each axle. Further, a meter can also be provided, the meter needle indicating the axle load.

As described above the system of the present invention is particularly for use on a truck, articulated or otherwise. However the system can be installed entirely on a trailer having its own electrical power source e.g. battery, thus enabling the trailer to be correctly loaded to within the maximum permitted load limits of its axle or axles, prior to attachment to a tractor unit. In this latter case the control box is mounted at some convenient location on the trailer.

Whilst the system described hereabove utilizes two spaced apart load monitoring devices per axle, in an alternative arrangement the system can be modified by the provision of only one load monitoring device 39 mounted in a central region of the axle housing FIG. 7, the device 39 having a carrier plate 40 with a pair of strain gauges 41, 42 and 43, 44 mounted on each side thereof. One gauge of each pair of gauges is arranged to measure strain applied to the axle in line with said two spaced apart positions and the other gauge of each pair is arranged to measure strain in a direction at 90° to a line drawn between said two spaced apart positions. The gauges of each pair of strain gauges are series connected and the two pairs of strain gauges are connected in a four-arm balancing bridge as previously described with reference to FIG. 4. The bridge provides an output voltage in this arrangement which is representative of twice the axle loading, the voltage being passed to the amplifier 10 the gain of which is adjusted so that the alarm will only be activated by a signal from the amplifier via comparator 13, when the maximum permitted load limit of the axle is exceeded or equalled.

The systems described hereabove have the advantage that they utilize one bridge with two active gauges 3 and thus have only one amplifier i.e. amplifier 10, looking at one summed output from the bridge circuit. The most sensitive active half of the bridge circuit is attenuated to achieve equal or balanced sensitivities. Further the system according to the present invention does not produce a continuously variable signal for transmission to the detector 24, but produces discrete signal levels which are easier to detect than variations in continuously varying signals i.e. lower tolerance circuits can be used.

The systems described hereabove enable the total load on the axle to be monitored. However, they do not tell the driver whether the load is centrally located on the axle or towards one or other of the ends of the axle. Taking the case where spaced apart load monitoring devices 8 and 9 are mounted on the axle, this monitoring of the eccentricity of the load relative to the axle can be monitored by the provision of a further load monitoring device 45 connected with the existing devices 8 and 9 as illustrated in FIG. 8. Rather than provide the additional load monitoring device 45 in the region of one of the existing devices 8, 9, an additional pair of strain gauges can be mounted on the underside of one of the existing load monitoring device carrier plates. The additional dummy and active gauges of device 45 are arranged to measure the strain transverse and axially of the axle respectively. As shown in FIG. 8 the additional load monitoring device 45 is connected to a d.c. power supply in the manner illustrated in FIG. 2A, the existing device 9 at the same end of the axle as device 45 being connected to the d.c. power supply in the manner illustrated in FIG. 2B. If voltage outputs 5 and 7 are fed to the chopper amplifier 10, the total load on the axle is monitored as previously described. If, however, the output 7 is left switched off, and the outputs from terminals 5 and 46 are fed to the amplifier 10, the output from the amplifier will represent the difference in strains of either end of the axle, i.e. how heavier one side is than the other. With a centrally placed load the bridge outputs from terminals 5 and 46 are arranged to produce a predetermined signal at the output of the amplifier 10, and that output signal will increase or decrease according to whether the near-side or off-side of the axle is heavier.

Preferably, the control box 20 in the driver's cab will contain a push button (not shown) which, when operated, will cause a signal to be sent to the amplifier 10 causing bridge output 7 to be disconnected and the bridge output 46 to be connected so causing the amplified signal either to represent axle load with the button inoperated, or off-centre load with the button depressed. Also, an indicating meter (not shown) can be arranged that when the push button is depressed, the needle assumes a central position for a central load. However, should the load be displaced to either side, the needle will indicate accordingly. In this mode the meter is made more sensitive so that a full deflection either way is obtained when the heavy side to light side differential exceeds a low percentage of the maximum permitted axle load. In an alternative embodiment warning lamps (not shown) can be used to supplement or replace the indicating meter. The lamps which are preferably on the indication box, will normally be switched on indicating that the system is connected. In the case where two lamps are provided for each axle, one lamp will effectively monitor one end of the axle and the other lamp the other end of the axle. By operating the said button the eccentricity of the load will be monitored and should the difference between the loadings at the ends of the axle exceed a certain percentage of the maximum permitted loading of the axle, one of the lamps will flash indicating which end of the axle has the greater loading. Alternatively, only one warning lamp (not shown) can be provided for each axle and an offside and a nearside interrogation switch (not shown) can be provided. By operating the switches in turn the loading at each end of the axle is monitored, the lamp flashing to indicate the axle end with the greater loading if the difference between the loadings at the ends of the axle exceed a predetermined percentage of the maximum permitted loading of the axle.

Thus, the present invention provides a load monitoring device which can be used to monitor the total load and its eccentricity on an axle. In normal operation with everything connected correctly a warning lamp lights up on the indication box and should the maximum permitted loading of an axle be exceeded the lamp will flash and an audible warning will sound. Thus the present invention provides for the automatic monitoring of the axle loading without requiring a driver to inspect an indicator at various intervals. As an alternative to warning lamps a digital display or displays may be used.

The load monitoring devices of the system described hereabove may each be attached to the axle housing in a number of ways. Several different methods of attachment are illustrated in FIGS. 9 to 12, enabling the load monitoring devices to be easily attached to an existing axle without requiring existing equipment to be dismantled.

Figure 9:
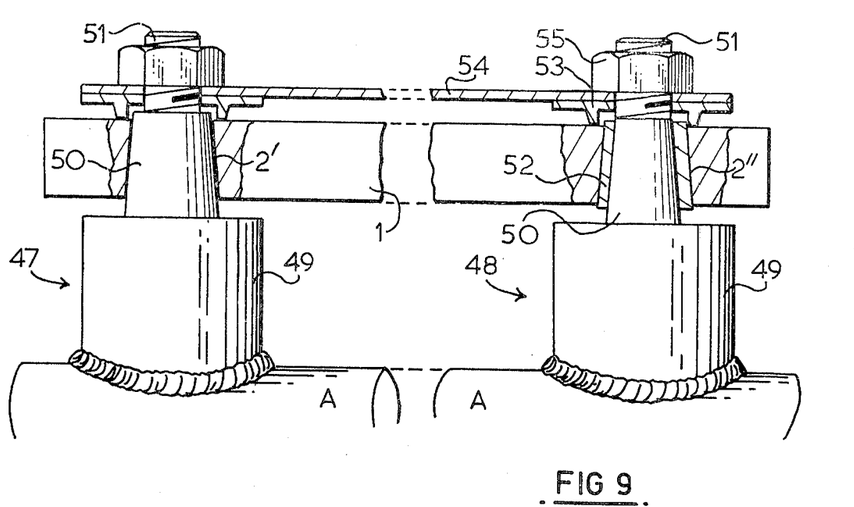

In FIG. 9 the carrier plate 1 is mounted on a pair of threaded bosses 47, 48 which are welded on the axle A. Each threaded boss has a cylindrical portion 49 from which a tapered portion 50 axially projects, and a threaded section 51 projecting axially from the tapered portion 50, the tapered portion 50 of threaded boss 48 being smaller in diameter than the tapered portion 50 of threaded boss 47. The fixing holes in the carrier plate are tapered bores 2', 2", the bore 2' being complementary to the tapered portion 50 of threaded boss 47 whereas the bore 2" is larger than the tapered portion 50 of threaded boss 48. A frustoconical bush 52 fills the gap between tapered portion 50 of boss 48 and bore 2". The bush 52 has an axial bore the central axis of which is displaced from the central axis of the outer surface of the bush i.e. the bush is eccentric. Thus the bush 52 can be rotated on boss 48 to take up manufacturing tolerances in the location of the threaded bosses on the axle and/or the location of the fixing holes in the carrier plate, so providing a rigid connection for the carrier plate with the axle. Relieved washers 53, triangular torque relieving washers 54 and nuts 55 hold the carrier plate tight down on the tapered portions 50.

Figure 10:
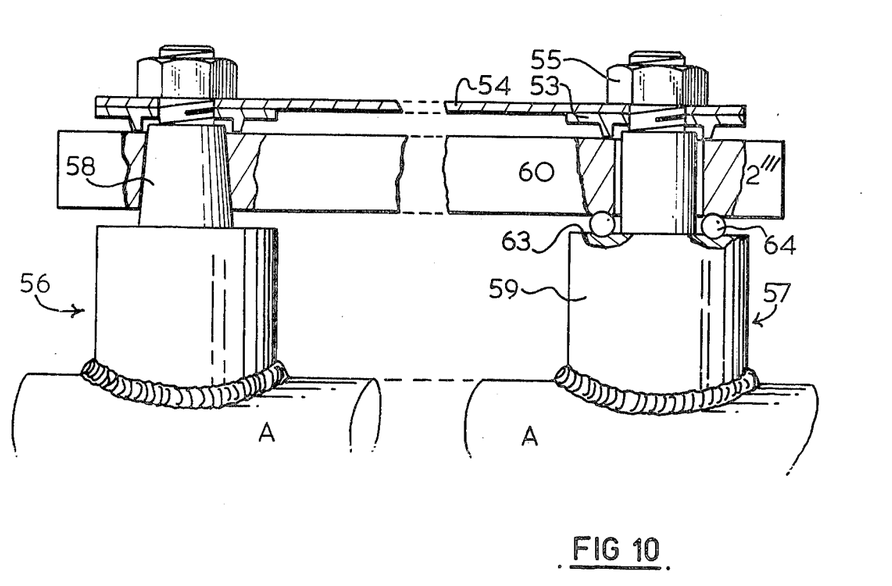

FIG. 10 illustrates a further way of rigidly attaching a load monitoring device to an angle. The carrier plate 1 of the load monitoring device is again located on threaded bosses 56, 57 which are welded to the axle A. Boss 56 is identical to boss 49 of FIG. 9, the carrier plate being bolted down on the tapered portion 58 thereof. However the other boss 57 has a cylindrical portion 59 from which projects a smaller diameter cyclindrical portion 60, not a tapered portion. Where the cylindrical portions 59 and 60 join a shoulder 63 is formed, and over the cylindrical portion 60 and resting on this shoulder 63, is located a washer 64 (see FIG. 10A) incorporating a number of ball bearings 65. A cylindrical bore 2''' in the carrier plate engages over cylindrical portion 60 with clearance and, as in FIG. 9, relieved washers 53, triangular torque relieving washers 54 and nuts 55 hold the carrier plate on the bosses 56, 57. To provide the required rigid connection between the bosses and the carrier plate, the nut on boss 59 is tightened sufficiently for ball bearings 65 to bite into shoulder 63 and the carrier plate 1.

In an alternative embodiment (not illustrated) the fixing holes in the carrier plate can both engage with clearance over cylindrical portions of the bosses, washers identical to washer 65 being used on both bosses to provide the required rigid interconnection.

Figures 10A, 11:
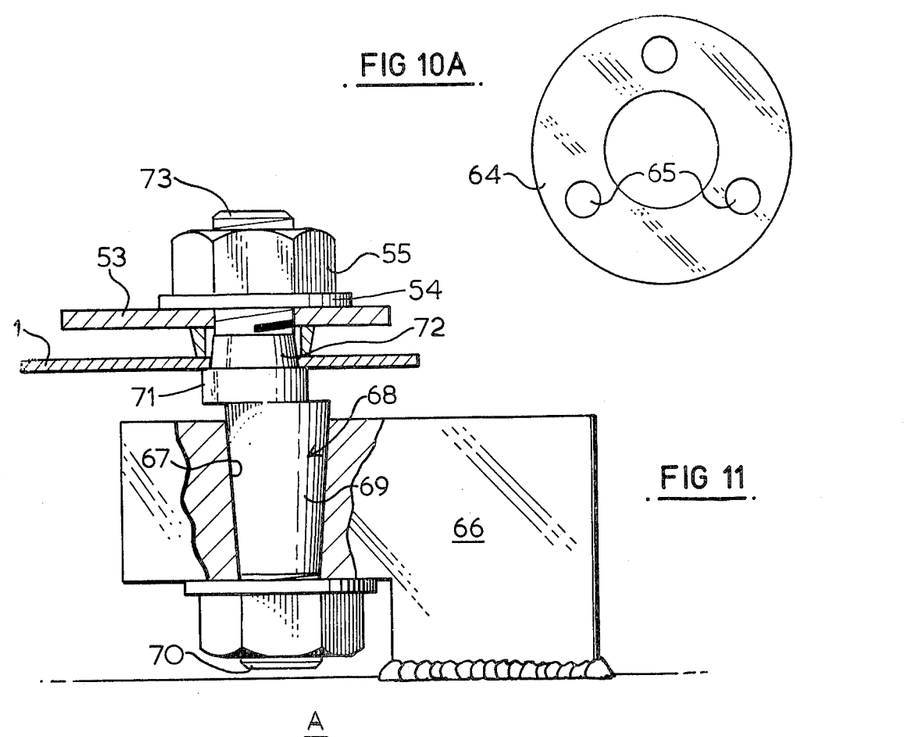

FIG. 11 illustrates a still further way of mounting the load monitoring devices. Only one end of the carrier plate 1 is illustrated as the other end is mounted as illustrated in the left hand side of FIGS. 9 and 10. In FIG. 11 a member 66 is welded to the axle A, this member 66 having a tapered bore 67 through which a support 68 extends. The support shaft 68 has a cranked configuration, one arm 69 of the shaft being tapered and being engaged in bore 67, a nut on threaded shaft extension 70 retaining the shaft in this position. The other arm which is eccentric to tapered arm 69 has a shoulder portion 71 from which projects a further tapered portion 72 and a threaded portion 73. A fixing hole in the carrier plate 1 engages over further tapered portion 72 against shoulder portion 71 and is retained there, as in FIGS. 9 and 10, by a relieved washer 53, torque relieving washer 54 and nut 55. To take up manufacturing tolerances which has occurred in the positioning of member 66 relative to the boss supporting the other end of the carrier plate, shaft 68 is rotated in bore 67 and locked in position by tightening nut 55.

Figure 12:
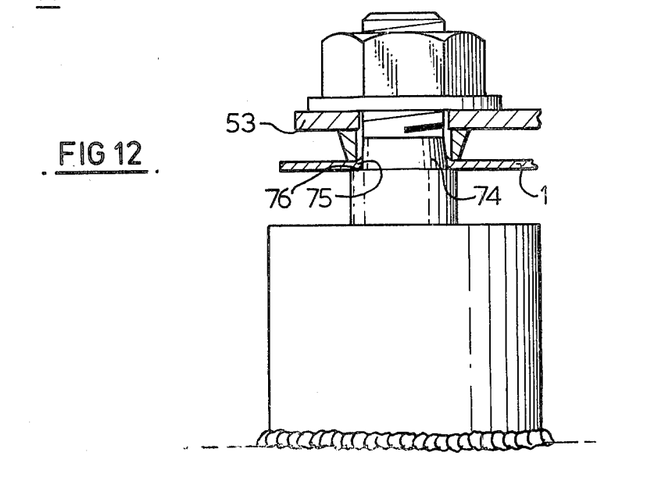

FIG. 12 illustrates a rigid interconnection between axle and carrier plate, again using a threaded boss, the boss having a tapered portion 74 part of which is larger in diameter than the fixing hole in the carrier plate 1. Utilising a relieved washer 53 the carrier plate 1 is forced down over the tapered portion 74 deforming the lip 75 of the fixing hole in the carrier plate 1, until the carrier plate engages shoulder 76 on the boss.

Whilst the above described ways of mounting a carrier plate require threaded bosses welded to the axle housing, alternatively the bosses may be screwed into threaded bores formed in the axle housing or the carrier plate may be bolted to the axle housing or attached to studs stud welded to the axle. As a further alternative the carrier plate can be spot welded to the axle housing or directly bonded (FIGS. 13 and 14 respectively).

Figure 15:
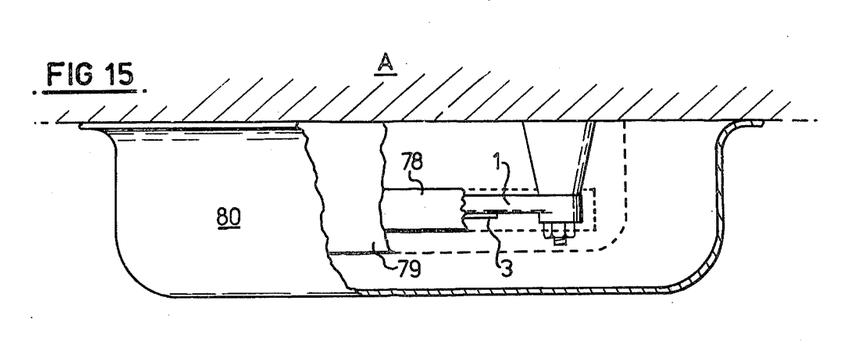
FIG. 15 is a partially cutaway view of a load monitoring device mounted on an axle ready for use.

A load monitoring device can be attached to an axle housing utilising any of the above described methods. Preferably though to protect the strain gauges on the carrier plate, the plate is embedded in a non absorbent e.g. moisture repellant, material. This is illustrated in FIG. 15 wherein the carrier plate 1 is embedded in silicon rubber 78. A further protective layer 79 of shock absorbent resilient material e.g. butyl rubber, covers the silicon rubber 78 and a protective shield 80 is located over the device and attached to the axle by welding. Alternatively the casing 80 can be bolted to the axle and if required the protective layer 79 can be omitted. Further, rather than attach the shield 80 directly to the axle, the shield can be secured to the axle by being adhered to the carrier plate, non-absorbent material and/or shock absorbent material.

We claim as our invention:

1. A load monitoring system for a road vehicle, said system comprising at least one load monitoring device for mounting on an axle of the vehicle so as to measure the deflection of the axle when under load, at least one pair of strain gauge elements forming each load monitoring device, the strain gauge elements of each pair being arranged to measure strain in different directions, an amplifier connected to said at least one load monitoring device and adapted to emit a signal dependent upon the load, a comparator circuit connected to the amplifier and an alarm, the comparator circuit being arranged to activate the alarm should the signal received from the amplifier exceed a predetermined value.

2. A load monitoring system according to claim 1, wherein a pair of load monitoring devices are mounted on an axle of a vehicle at spaced apart locations, each load monitoring device having a rectangular carrier plate provided with two fixing holes, one hole towards either end region of the carrier plate, two strain gauge elements being located on the carrier plate at spaced locations between the fixing holes, one strain gauge element of each device being arranged to measure strain applied to the axle in line with said two spaced apart locations and another gauge element of each load monitoring device being arranged to measure strain in a direction at 90 degrees to a line drawn between said two spaced apart locations, the strain gauge elements of each load monitoring device being connected in series with each other and the two pairs of strain gauge elements being connected in a four-arm balancing bridge which provides an output voltage which is fed to the amplifier and which is representative of the sum of the strains measured at said spaced apart locations on the axle.

3. A load monitoring system for a road vehicle, said system comprising at least one load monitoring device for mounting on an axle of the vehicle so as to measure the deflection of the axle when under load, at least one pair of strain gauge elements forming each load monitoring device, the strain gauge elements of each pair being arranged to measure strain in different directions, an amplifier connected to said at least one load monitoring device and adapted to emit a signal dependent upon the load, a comparator circuit connected to the amplifier and an alarm, the comparator circuit being arranged to activate the alarm should the signal received from the amplifier exceed a predetermined value, said load monitoring device being mounted on an axle of the vehicle in the central region of the axle, the load monitoring device having a rectangular carrier plate provided with two fixing holes, one hole towards each eand of the carrier plate, a pair of strain gauge elements being mounted on each side of the carrier plate between said fixing holes, one strain gauge element of each pair of elements being arranged to measure strain in a direction along the longitudinal axis of the vehicle axle, each pair of strain gauge elements being connected in series and the two pairs of strain gauge elements being connected in a four-arm balancing bridge which provides an output voltage which is fed to the amplifier.

4. A load monitoring system according to claim 3 wherein the two spaced apart locations lie along the longitudinal axis of the axle.

5. A load monitoring system according to claim 2, wherein the load monitoring devices are mounted one at each end region of the axle.

6. A load monitoring system according to claim 2, wherein an additional pair of series interconnected strain gauge elements are arranged adjacent to the strain gauge elements of one said load monitoring devices, one strain gauge element of said additional pair of strain gauges being arranged to measure strain along the axle and the other strain gauge element of said additional pair of strain gauge elements being arranged to measure strain at 90° to the longitudinal axis of the axle, said additional pair of strain gauge elements being connectible in the four-arm balancing bridge in place of the pair of strain gauge elements constituting said one load monitoring device, in such a manner that the output of the bridge represents the difference in strains at either of said spaced apart locations on the axle.

7. A load monitoring system according to claim 6, wherein the additional pair of series interconnected strain gauge elements are mounted on the carrier plate of said one load monitoring device.

8. A load monitoring system according to claim 6, wherein a third load monitoring device is formed by said additional pair of strain gauge elements mounted on a carrier plate, the third load monitoring device being mounted on the axle adjacent to said one of the load monitoring devices.

9. A load monitoring system according to claim 2, wherein the carrier plate of the or each load monitoring device is bolted onto threaded bosses which are welded onto the axle.

10. A load monitoring system according to claim 9, wherein each threaded boss has a tapered portion over which the fixing holes in the carrier plate engage, the fixing holes each being in the form of a tapered bore, the tapered portion of one boss being complementary to the tapered bores whereas the other boss is of reduced diameter, an eccentric bushing filling the gap between the tapered bore and the tapered portion of the other boss.

11. A load monitoring system according to claim 9, wherein the carrier plate is attached to a threaded boss with a washer carrying a number of spaced ball bearings being compressed between a shoulder of the boss and the carrier plate.

12. A load monitoring system according to claim 2, wherein the carrier plate of the or each load monitoring device is mounted at one end on a threaded boss and is mounted at the other end on one arm of a cranked support shaft, the other arm of the cranked shaft being tapered and engaged in a tapered bore in a member welded to the axle housing.

13. A load monitoring system according to claim 9, wherein at least one threaded boss has a tapered portion, part of which is larger in diameter than the fixing holes in the carrier plate, the lip of the fixing hole being deformed as the carrier plate is tightened down on the threaded boss.

14. A load monitoring system according to claim 2, wherein at least the strain gauge elements on the carrier plate of each load monitoring device are covered with a non-absorbent material.

15. A load monitoring system according to claim 14, wherein the non-absorbent material is a silicon rubber.

16. A load monitoring system according to claim 14, wherein a resilient material is applied to the non-absorbent material and a protective cover is located over each load monitoring device and secured to the axle.

17. A load monitoring system according to claim 2, wherein each load monitoring device has a carrier plate on which the pair of strain gauges is mounted, the carrier plate being attached to the axle by spot welding.

18. A load monitoring system according to claim 2, wherein the carrier plate of each load monitoring device is directly bonded to the axle.

19. A load monitoring system for a road vehicle, said system comprising at least one load monitoring device for mounting on an axle of the vehicle so as to measure the deflection of the axle when under load, at least one pair of strain gauges forming each load monitoring device, the strain gauge elements of each pair being arranged to measure strain in different directions, an amplifier connected to said at least one load monitoring device, a comparator circuit connected to the amplifier and adapted to both emit a continuous signal when the system is energized and the load on the axle is smaller than a predetermined weight, and to change said signal to another signal when said load exceeds said predetermined weight, and an alarm arranged to be controlled in dependence upon the signal emitted by the comparator circuit.

20. A load monitoring system according to claim 19, wherein a number of alarms are provided and the comparator circuit is adapted to change said continuous signal to one of at least two other signals dependent upon the load on the axle, the alarm activated being dependent upon the signal emitted by the comparator circuit.

21. A load monitoring system according to claim 19, wherein a detector is arranged to receive the signal emitted by the comparator circuit and to activate one of at least two alarms, the alarm so activated being dependent upon the signal emitted by the comparator circuit.

22. A load monitoring system according to claim 21, wherein two alarms are provided and the comparator circuit is adapted to change said continuous signal to one of two other signals dependent upon the load on the axle, the detector activating one of the two alarms dependent upon which of said two other signals is received.

23. A load monitoring system according to claim 22 wherein a warning lamp is arranged to be lit by the detector when the comparator circuit emits said continuous signal, and one of said alarms in the form of a warning lamp is arranged to flash when this continuous signal changes to one of said two other signals due to an increase in load, the other alarm being arranged to be activated when this continuous signal changes to the other of said two other signals due to a further increase in load on the axle.

24. A load monitoring system for a road vehicle, said system comprising at least one load monitoring device for mounting on an axle of the vehicle so as to measure the deflection of the axle when under load, at least one pair of strain gauge elements forming each load monitoring device, the strain gauge elements of each pair being arranged to measure strain in different directions, an amplifier connected to said at least one load monitoring device, a comparator circuit connected to the amplifier and, adapted to emit a signal when the system is energized, the emitted signal being dependent upon the load on the axle, an alarm being arranged to be activated dependent upon the signal emitted.

25. A load monitoring system according to claim 24, wherein the comparator circuit is adapted to emit any one of a number of possible signals, the emitted signal being dependent upon the load on the axle.

* * * * *

UNITED STATES PATENT AND TRADEMARK OFFICE
CERTIFICATE OF CORRECTION

PATENT NO. : 4,086,576

DATED : April 25, 1978

INVENTOR(S) : Alan Jebb, et al

It is certified that error appears in the above—identified patent and that said Letters Patent is hereby corrected as shown below:

Columns 1 and 2 of the above-identified patent should be deleted to appear as per attached.

Signed and Sealed this

Twenty-seventh Day of January 1981

[SEAL]

Attest:

RENE D. TEGTMEYER

Attesting Officer — Acting Commissioner of Patents and Trademarks

AXLE LOAD MONITORING SYSTEMS

BACKGROUND OF THE INVENTION

The present invention relates to a load monitoring system for use in monitoring the loading applied to a vehicle axle.

Load is applied to an axle of a road vehicle via its suspension. The axle is supported by its road wheels and an applied load therefore results in the axle bending. The amount of deflection of the axle is linearly proportional, within elastic limits, to the load on the suspension (i.e. the load on the axle), and is not effected by hysteresis or dependence on time as is experienced by the suspension e.g. springs.

SUMMARY OF THE INVENTION

The system of the present invention can be used to monitor the axle load by measuring the extension of the bottom of the axle housing or the compression of the top of the axle housing.

According to the present invention there is provided a load monitoring system for a road vehicle, said system comprising at least one load monitoring device for mounting on an axle of the vehicle so as to measure the deflection of the axle when under load, the or each load monitoring device comprising at least one pair of strain gauge elements, the strain gauge elements of each pair being arranged to measure strain in different directions and being connected to an amplifier adapted to emit a signal dependent upon the load, the amplifier being connected to a comparator circuit which is arranged to activate an alarm should the signal received from the amplifier exceed a predetermined value.

The present invention thus provides a system wherein at least one load monitoring device comprising at least one pair of strain gauge elements is, in use, mounted on an axle of a vehicle to monitor the deflection of the axle under load. The strain gauge elements of each pair of strain gauge elements are arranged to measure strain in different directions and thus strain can be measured along the axle, i.e. due to load, and also at an angle, preferably 90° to the longitudinal axis of the axle, in order to provide a temperature compensation.

The expression "strain gauge element" as used hereinbefore and hereinafter refers to any form of element which is capable of measuring strain in a member. For example this expression covers the common foil-type strain gauge and the semi-conductor type of strain gauge.

In a preferred embodiment of the system according to the present invention two load monitoring devices are provided, each having a pair of strain gauge elements. In use, the load monitoring devices are mounted one at each end of an axle just inboard of the springs. One strain gauge element of each load monitoring device is arranged to measure strain along the axle and the other strain gauge element of each load monitoring device is arranged to measure strain at 90° to the longitudinal axis of the axle i.e. to provide a temperature compensation and to also increase the electrical output of the device by measuring the effect of induced transverse strain i.e. Poisson's ratio. The strain gauge elements are connected in a four-arm bridge in such a way that the output of the bridge, which is fed to the amplifier, is representative of the sum of the loads at each end of the axle. In an alternative embodiment of the present invention two pairs of strain gauge elements are incorporated in one load monitoring device which is, in use, mounted in a central region of the axle. The strain gauge elements are again connected in a four-arm bridge so that the bridge output is representative of twice the axle load, the bridge output being fed to the amplifier. The amplifier in either embodiment emits a signal dependent upon the axle load and the comparator circuit activates an alarm, visual and/or audible, preferably in the cab of the vehicle, should the signal i.e. load, exceed a predetermined value.

According to a further feature of the present invention there is provided a load monitoring system for a road vehicle, said system comprising at least one load monitoring device for mounting on an axle of the vehicle so as to measure the deflection of the axle when under load, the or each load monitoring device comprising at least one pair of strain gauge elements, the strain gauge elements of each pair being arranged to measure strain in different directions and being connected to an amplifier which is connected to a comparator circuit, the comparator circuit being adapted to both emit a continuous signal when the system is energized and the load on the axle is smaller than a predetermined weight, and to change said signal to another signal when said load exceeds said predetermined weight, an alarm being controlled in dependence upon the signal emitted by the comparator circuit.

A load monitoring system constructed according to this further feature of the present invention can incorporate load monitoring device arrangements the same as those described hereabove with reference to the present invention. However, this further feature of the present invention utilises a comparator circuit which, when the system is energized, emits a continuous signal, the signal changing as the axle load is increased beyond predetermined weight levels. Dependent upon the signal emitted by the comparator circuit and received by the detector, one of a number of alarms is activated to indicate a particular load level.

Of particular interest to the present invention is the situation in which the legal plated weight limit (weight limit permitted after government testing) of an axle is exceeded and applying this further feature of the present invention to such a situation an alarm can be provided to indicate when this limit is exceeded.

According to a still further feature of the present invention there is provided a load monitoring system for a road vehicle, said system comprising at least one load monitoring device for mounting on an axle of the vehicle so as to measure the deflection of the axle when under load, the or each load monitoring device comprising at least one pair of strain gauge elements the strain gauge elements of each pair being arranged to measure strain in different directions and being connected to an amplifier which is connected to a comparator circuit, the comparator circuit being adapted to emit a signal when the system is energised, the emitted signal being dependent upon the load on the axle, an alarm being arranged to be activated depending upon the signal received.

This still further feature of the present invention utilizes a comparator which can emit any one of a number of possible signals dependent upon the load representative signal received from the amplifier. The signal emitted by the comparator is sensed by the detector and in dependence upon which signal is emitted, a particular alarm is activated. This still further feature of the pres-